United States Patent [19]
Urbanek et al.

[11] Patent Number: 5,334,009
[45] Date of Patent: Aug. 2, 1994

[54] HANDLING DEVICE FOR REMOVING FORMED PLASTIC PARTS FROM THE SPACE BETWEEN DIE PLATENS CARRYING THE MOULD HALVES OF AN INJECTION MOULDING MACHINE

[75] Inventors: Otto Urbanek, Linz; Walter Aumayer, Au/Donau, both of Austria

[73] Assignee: Engel Maschinenbau Gesellschaft m.b.H., Schwertberg, Austria

[21] Appl. No.: 966,043
[22] PCT Filed: Apr. 24, 1992
[86] PCT No.: PCT AT 92/00058
  § 371 Date: Dec. 28, 1992
  § 102(e) Date: Dec. 28, 1992
[87] PCT Pub. No.: WO 92/19434
  PCT Pub. Date: Nov. 12, 1992

[30] Foreign Application Priority Data
  Apr. 26, 1991 [AT] Austria .................. 875/91

[51] Int. Cl.⁵ ............................. B29C 45/42
[52] U.S. Cl. ................... 425/556; 425/436 R
[58] Field of Search ........... 425/436 R, 556, 444

[56] References Cited

U.S. PATENT DOCUMENTS

| | | | |
|---|---|---|---|
| 3,947,208 | 3/1976 | Broderick | 425/436 R |
| 4,204,824 | 5/1980 | Paradis | 425/436 R |
| 4,781,571 | 11/1988 | Heindl et al. | 425/556 |
| 4,787,841 | 11/1988 | Simon | 425/556 |
| 4,795,124 | 1/1989 | Nagai | 425/556 |
| 4,901,589 | 2/1990 | Gaigl | 425/556 |
| 4,995,801 | 2/1991 | Hehl | 425/556 |
| 5,037,597 | 8/1991 | McGinley et al. | 425/556 |

FOREIGN PATENT DOCUMENTS

| | | | |
|---|---|---|---|
| 0311133 | 6/1988 | European Pat. Off. | |
| 3631314 | 4/1986 | Fed. Rep. of Germany | |
| 3641135 | 9/1988 | Fed. Rep. of Germany | |
| 62-85919 | 4/1987 | Japan | 425/556 |
| 62-288020 | 12/1987 | Japan | 425/436 R |

*Primary Examiner*—Charles S. Bushey
*Attorney, Agent, or Firm*—Notaro & Michalos

[57] ABSTRACT

A handling device for an injection molding machine of plastic parts, removes the molded plastic parts from between a pair of platens. The handling device includes a rigid gripper arm which is pivotable about an axis extending parallel to a longitudinal direction of the machine. The handling device is supported directly on a machine frame which also carries the die platens. A space between the platens is left free of conventional longitudinal bars so that the rigid gripper arm can freely pivot into and out of the space between the die platens. Advantageously, the gripper arm is straight in a preferred embodiment of the invention and the simple pivotable movement of the arm is capable of moving the arm into a broad work area between platens for removing plastic parts from the platens.

6 Claims, 7 Drawing Sheets

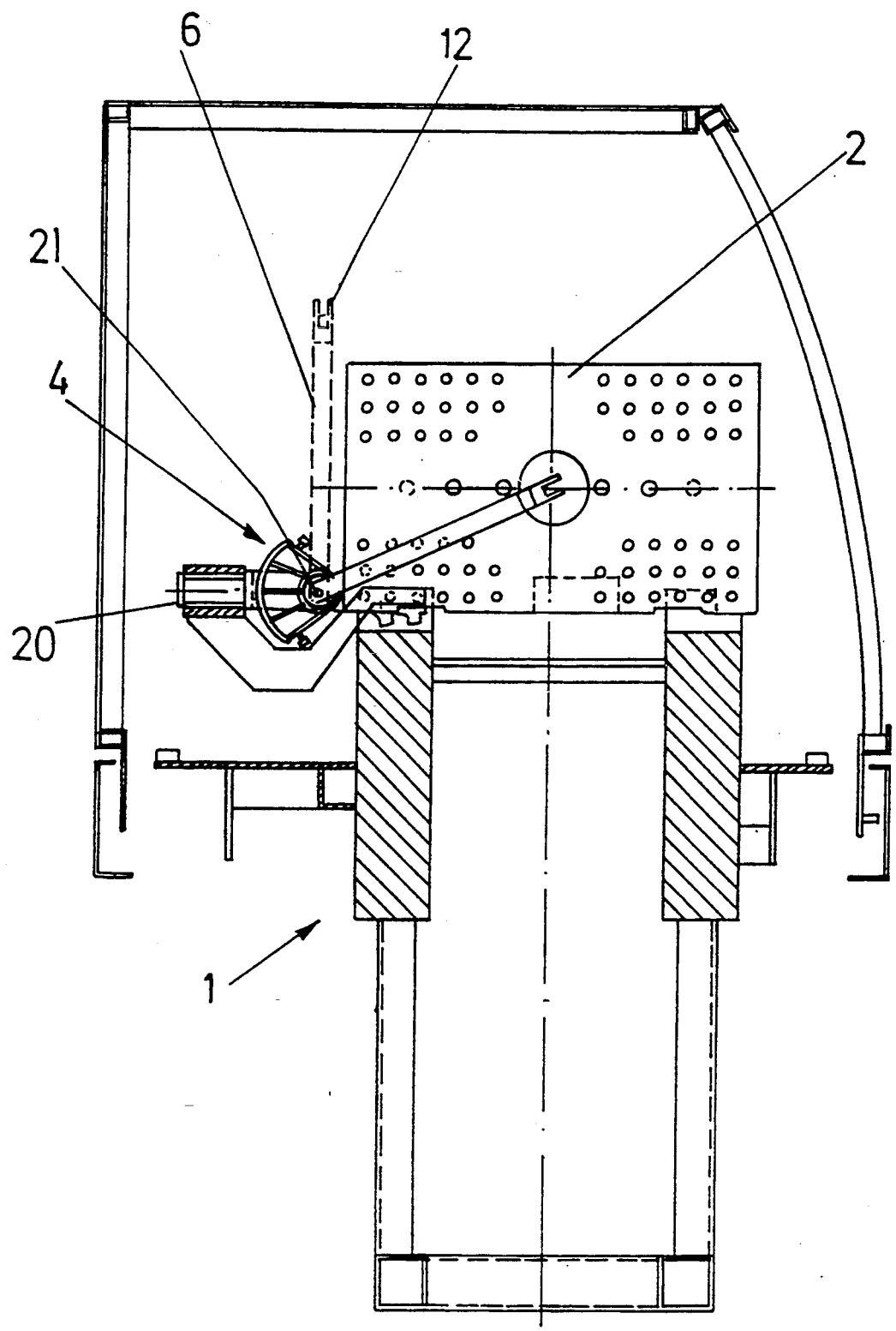

HANDLING DEVICE FOR REMOVING FORMED PLASTIC PARTS FROM THE SPACE BETWEEN DIE PLATENS CARRYING THE MOULD HALVES OF AN INJECTION MOULDING MACHINE

FIELD AND BACKGROUND OF THE INVENTION

The invention relates to a handling device for removing moulded plastic parts from the space between die platens carrying the mould halves of an injection moulding machine wherein the handling device movable in the longitudinal direction of the injection moulding machine has a pivotable gripper arm.

Known handling devices, with which after the injection moulding process the moulded parts are removed from the mould, require large constructional expenditures and are, accordingly, expensive. The reason lies in particular therein that the gripper arms must carry out complicated motions in order to remove the moulded parts, whose extent can correspond in terms of size to that of the injection moulding platens, from the mould region. Somewhat simple are therefore only those handling devices with which only the point-form casting stalk can be removed from the injection moulding machine.

In known handling devices of the above defined type the gripper arm is pivotable about a transverse horizontal (see DE-PT 36 31 314 Cl) or about a vertical axis (see DE-A-36 41 135) into the space between the longitudinal bars which brace the machine frame and carry the movable injection moulding platen. The pivot range of the entire handling device becomes thereby large which is not only of disadvantage due to the space requirement connected therewith but rather also leads to the consequence that the handling device cannot be enclosed completely within the protective grating or housing.

SUMMARY OF THE INVENTION

It is the task of the invention to describe a handling device which is of simple construction whose pivot range projects as little as possible beyond the profile of the injection moulding machine itself so that the possibility is to be created of enclosing the handling device together with the injection moulding machine in a protective housing.

The task posed is solved thereby that the gripper arm is pivotable about an axis extending parallel to the longitudinal direction of the machine and the volume between the die platen is free of the customary longitudinal bars.

The handling device according to the invention is advantageously applicable in an injection moulding machine such as described in EP-A1-311 133.

Since the customary longitudinal bars became superfluous it is possible to move the longitudinal axis about which the gripper arm is pivotable very close to the die platen whereas in known arrangements a console or the like must ensure the necessary distance between handling device and longitudinal bar. The arrangement possible due to the invention of the longitudinal guidance of the handling device directly on the machine frame or the stationary die platen can lead to considerable savings in time due to the greater travelling speed of the handling device.

The invention permits implementing the gripper arm so that it is rigid and its length can also be constant although an implementation as parallelogram guide rod is also within the scope of the invention. Even when changing the mould height it is not necessary to change the gripper arm.

BRIEF DESCRIPTION OF THE DRAWINGS

In the following different embodiment examples of the invention will be described in conjunction with the Figures of the enclosed drawings wherein.

DESCRIPTION OF THE PREFERRED EMBODIMENT

Figure 1:
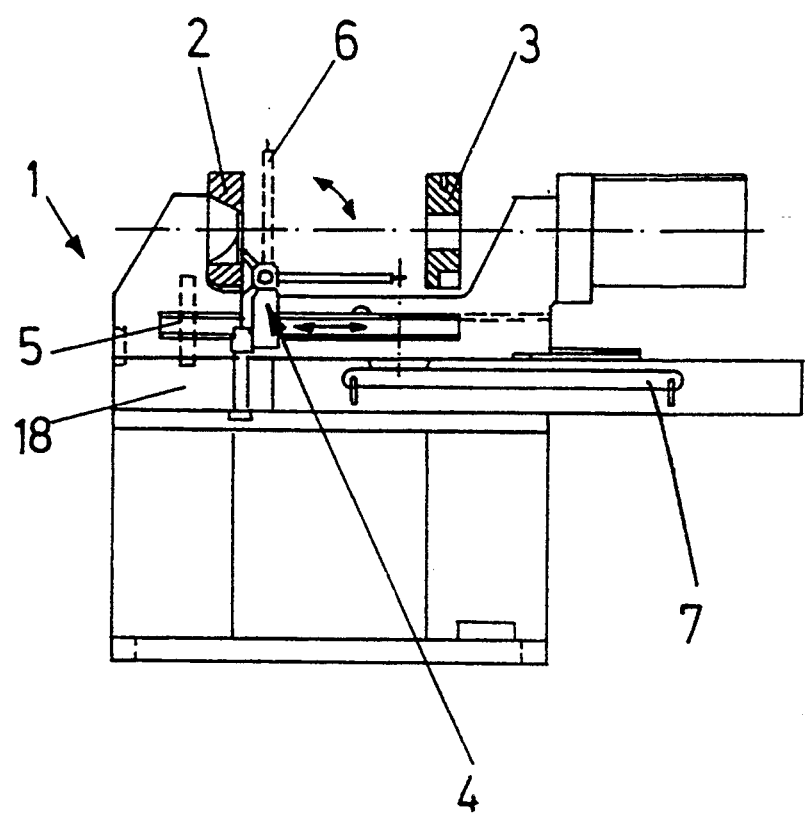
FIG. 1 a schematic side view of an injection moulding machine with a handling device according to the invention, FIG. 2 a section through an injection moulding machine and a view of the handling device according to the invention in longitudinal machine direction, FIG. 3 a view of the handling device from the direction of arrow A of FIG. 2, FIG. 4 a view of the handling device of FIG. 2 from above, wherein the die platen of the injection moulding machine are drawn in schematically, FIG. 5 a cross section through an injection moulding machine and a schematic front view of the handling device according to the invention according to a further embodiment example of the invention, FIG. 6 schematically a top view onto the handling device of FIG. 5, FIG. 7 a cross section through an injection moulding machine including front view of a further embodiment example of the handling device according to the invention, FIG. 8 a top view of FIG. 7, and FIG. 9 a cross section through an injection moulding machine and side views of a further embodiment example, or the arrangement of the handling device according to the invention.

In the Figures of the drawing the machine frame of the injection moulding machine is denoted very generally by 1. The stationary die platen is denoted by the reference symbol 2 and the movable die platen the reference symbol 3.

Figure 2:
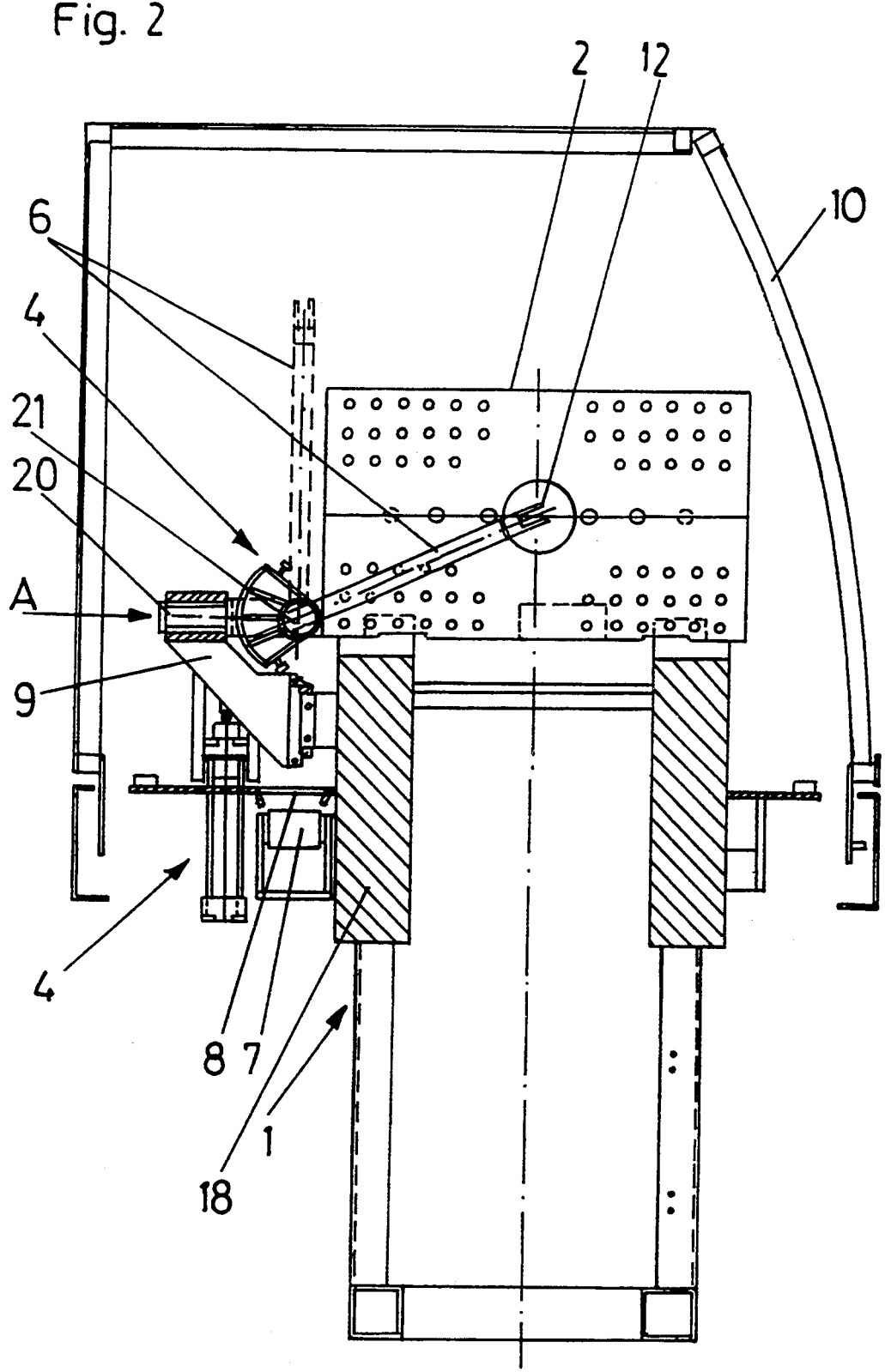
Figure 3:
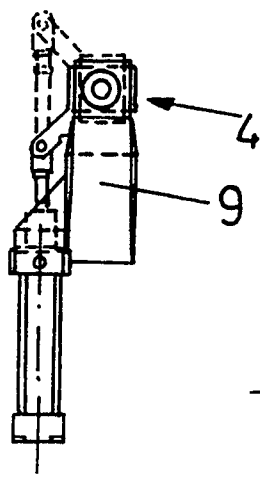
Figure 4:
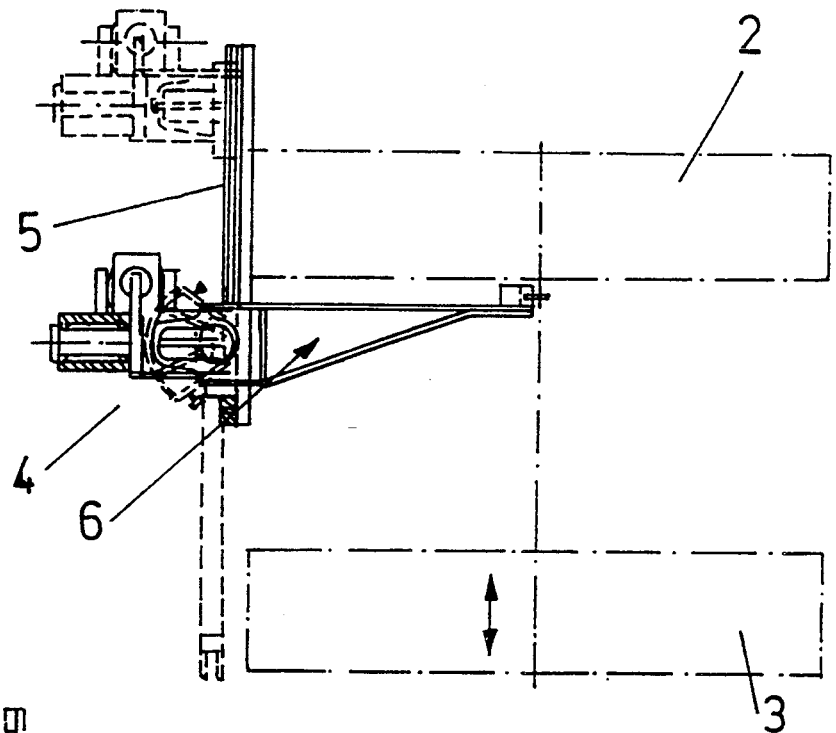

In the embodiment according to FIGS. 1 and 2 the handling device 4 according to the invention is supported on a rail 5 which is mounted on the back side of the injection moulding machine 1. The handling device 4 can be driven with its gripper arm 6 over the length of the rails 5.

On the back side of the injection moulding machine 1 below the handling device 4 is disposed a conveyor belt 7 which serves for receiving and transporting further of the moulded parts removed from the mould.

For the purpose of removing the moulded part the gripper arm 6 can be pivoted about an axis parallel to the longitudinal machine axis as indicated in FIG. 2 into the region between the two die platen 2 and 3, where it removes linearly the part from the mould by means of a gripping motion and/or suctioning the part. Subsequently a pivoting motion of the gripper arm 6 takes place (indicated in FIG. 1) about a horizontal transverse axis 20 until the gripper arm 6 is directed horizontally. In this position the gripper arm 6 releases the moulded part which, for example, falls through an opening 8 onto the conveyor belt 7 and is transported by it.

The rail 5 is held by laterally projecting supports 9 and is disposed outside of the closure region of the die platen 2, 3. Since the rail 5 extends into the region behind the stationary die platen 2, the handling device can also be slid so far that it does not hinder the exchange of the moulds, consequently the exchange of the mould halves fastened on the die platen. Of importance is that the gripper arm 6 with the entire handling device 4 is disposed within the protective grating 10 of the machine.

Figure 5:
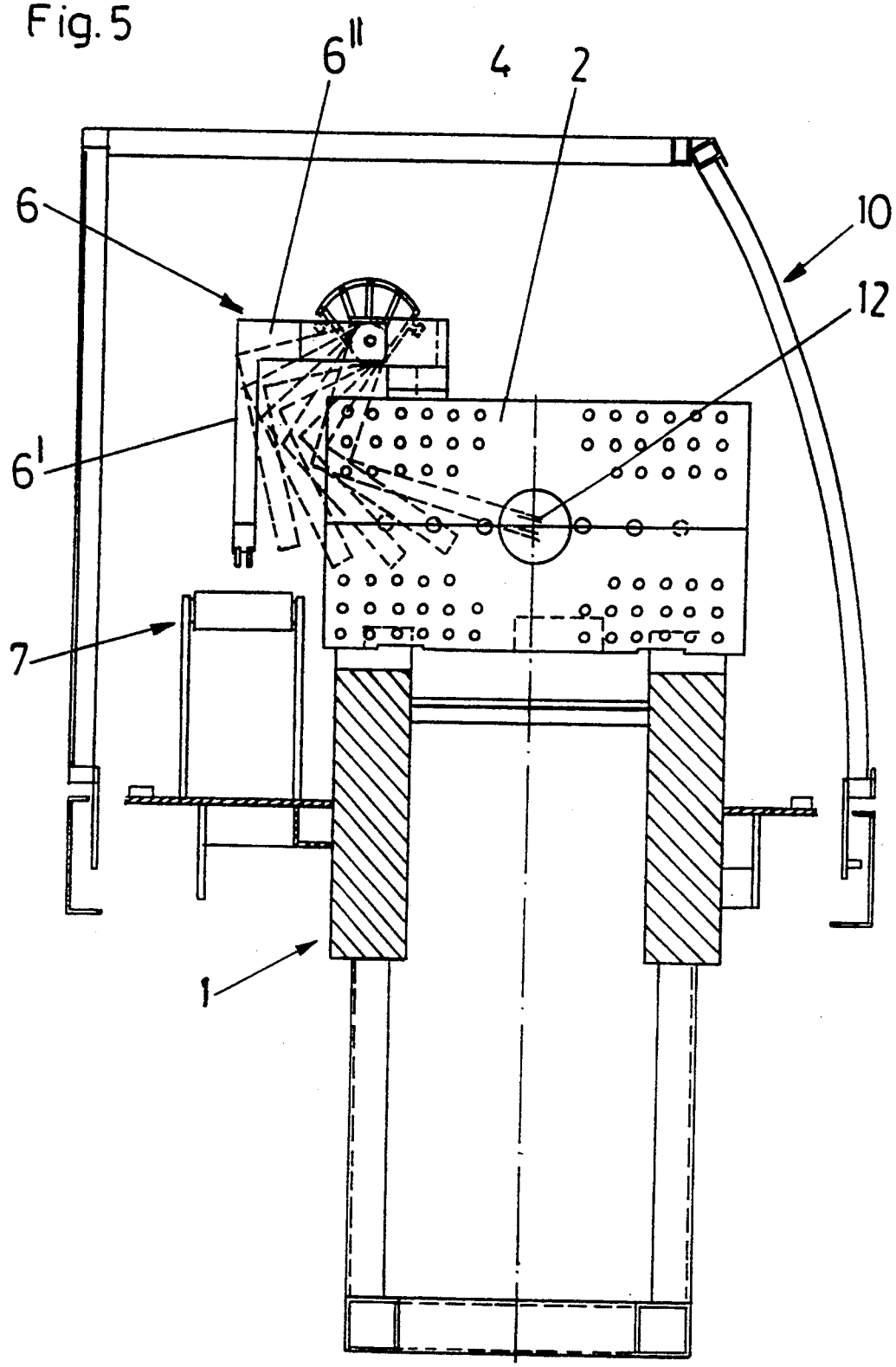

In the embodiment example according to FIG. 5 the handling apparatus 4 is disposed longitudinally movable on the upper side of the stationary die platen 2. The gripper arm 6 is implemented as an angular arm with two arms 6', 6" forming a right angle.

Figure 6:
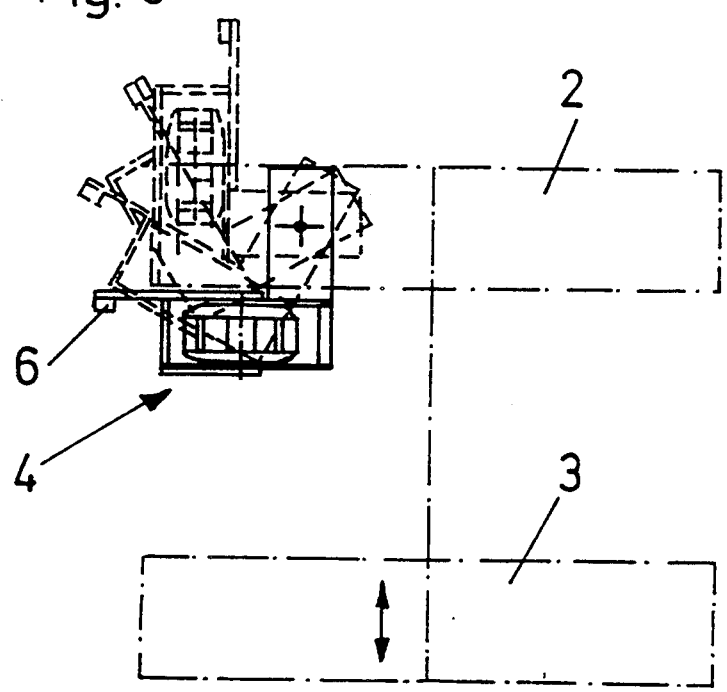

For the removal of the moulded parts the gripper arm 6, as drawn in FIG. 5 in dashed lines, is first pivoted into the closure region of the moulds or in the jet region of the injection moulding machine 1 whereupon a gripping or suctioning of the part and a linear motion to remove the part from the mould takes place, whereupon the gripper arm 6 swings out again into the vertical start position of the handling device. Subsequently a pivot motion about a vertical axis can take place (FIG. 6). When the gripper arm 6 has reached the delivery position, the moulded part is uncoupled and, in turn, deposited for example on a conveyor belt 7. Again the entire manipulation with the moulded part takes place within the protective covering 10 of the injection moulding machine 1.

Figure 8:
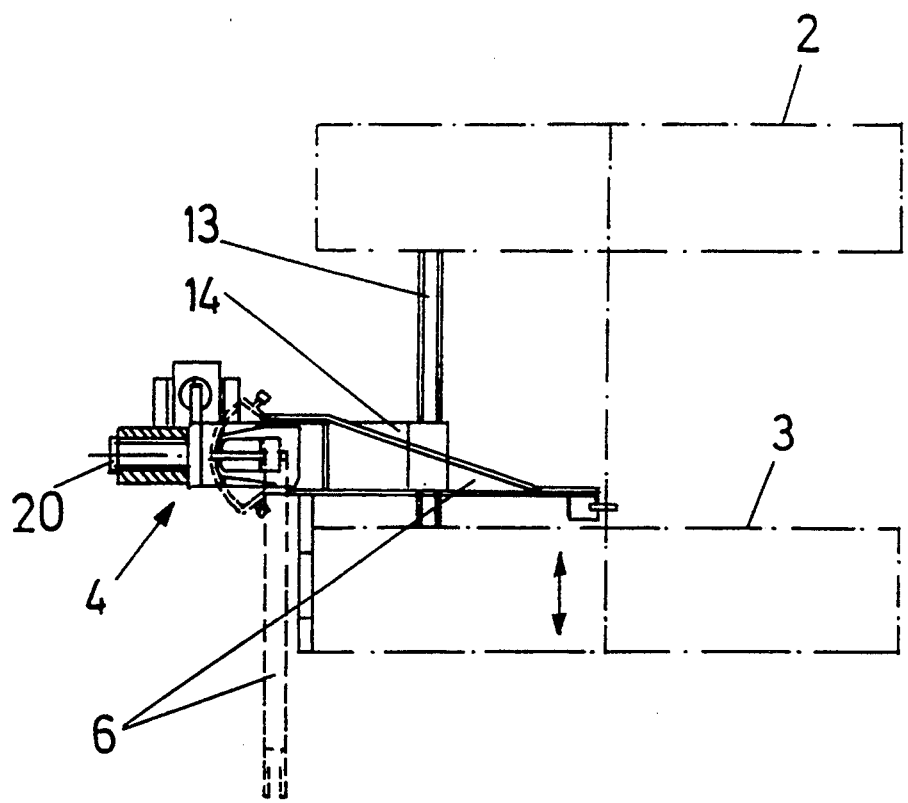

In the embodiment example according to FIGS. 7 and 8 the handling device 4 is supported by means of a runner shoe 14 or the like on one of the guide rails 13 which serve for guiding the movable mould half 3.

The handling device 4 is advantageously connected with the movable die platen 3 and participates in its travelling motion. The gripper arm 6 is in a plane directed perpendicularly to the longitudinal machine axis pivotable into the jet region and pivotable outside of the mould region from the vertical position shown in dashed lines in FIG. 7 into a horizontal position shown in dashed lines in FIG. 8.

Figure 9:
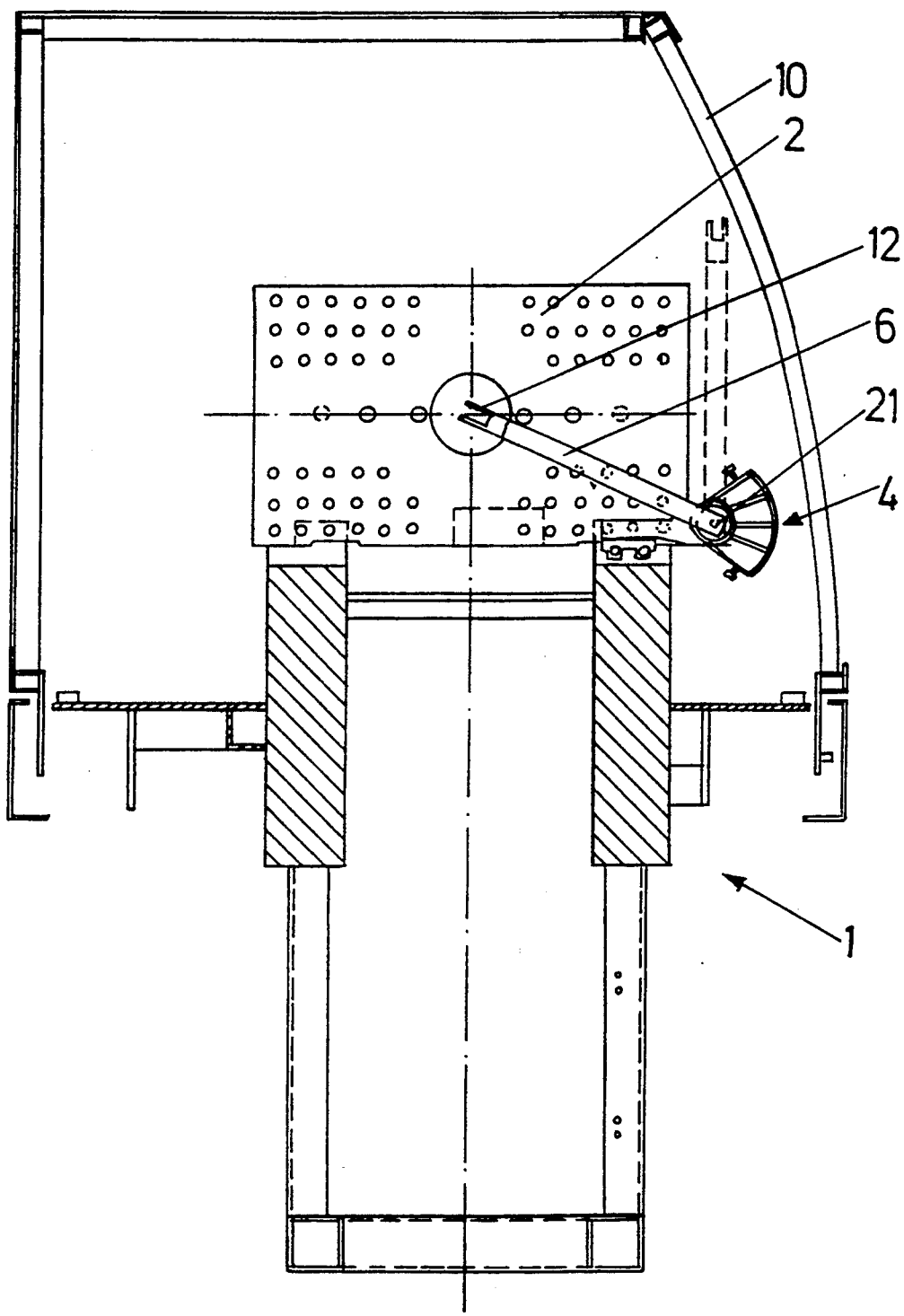

In the embodiment example according to FIG. 9 the handling device 4 in which the gripper arm 6 executes the same pivot motions as in the embodiment example according to FIG. 7 is disposed on the operator side of the injection moulding machine 1.

We claim:

1. Handling device (4) for removing moulded plastic parts from a space between die platens (2, 3) carrying mould halves of an injection moulding machine wherein the handling device (4) is movable in a longitudinal direction of an injection moulding machine (1) having a rigid gripper arm (6) which is pivotable about an axis (21) extending parallel to the longitudinal direction of the machine (1), the handling device comprising a machine frame (18) carrying the die platens (2, 3) without longitudinal bars, a space between the die platens (2, 3) being open and free of any longitudinal bars, and means supporting the handling device (4) with the gripper arm directly on the machine frame (18).

2. Handling device as stated in claim 1, the handling device (4) is movable on a rail (5) mounted on a side of the machine frame (18).

3. Handling device as stated in claim 1, wherein gripper arm (6) is additionally pivotable about a horizontal transverse axis (20) wherein the gripper arm (6) is orientable in top view parallel to a conveyor belt (7) disposed next to the injection moulding machine (1).

4. Handling device as stated in claim 1, wherein the handling device is movably supported with the gripper arm (6) on a guide rail (13) for a movable one of the die platens (3).

5. Handling device as stated in claim 1, wherein the gripper arm (6) is disposed within a protective machine grating (10).

6. Handling device according to claim 1, wherein the gripper arm (6) is straight.

* * * * *